(12) United States Patent
Wu et al.

(10) Patent No.: US 9,248,806 B2
(45) Date of Patent: Feb. 2, 2016

(54) APPARATUS, METHOD AND ARTICLE FOR SECURITY OF VEHICLES

(71) Applicant: Gogoro Inc., Hong Kong (CN)

(72) Inventors: Yi-Tsung Wu, New Taipei (TW); Hok-Sum Horace Luke, Mercer Island, WA (US); Huang-Cheng Hung, Taoyuan (TW); Matthew Whiting Taylor, North Bend, WA (US)

(73) Assignee: Gogoro Inc., Hong Kong (CN)

(*) Notice: Subject to any disclaimer, the term of this patent is extended or adjusted under 35 U.S.C. 154(b) by 251 days.

(21) Appl. No.: 13/671,144

(22) Filed: Nov. 7, 2012

(65) Prior Publication Data
US 2013/0116892 A1 May 9, 2013

Related U.S. Application Data

(66) Substitute for application No. 61/557,176, filed on Nov. 8, 2011.

(51) Int. Cl.
B60R 25/04 (2013.01)
B60R 25/09 (2013.01)

(52) U.S. Cl.
CPC .......... *B60R 25/09* (2013.01); *B60R 25/04* (2013.01); *B60R 2325/306* (2013.01)

(58) Field of Classification Search
USPC ........................................ 180/287
See application file for complete search history.

(56) References Cited

U.S. PATENT DOCUMENTS

| 3,470,974 | A | * | 10/1969 | Pefine | 180/287 |
| 3,664,450 | A | | 5/1972 | Udden et al. | |
| 3,678,455 | A | | 7/1972 | Levey | |
| 3,845,368 | A | | 10/1974 | Elco | |
| 4,669,570 | A | * | 6/1987 | Perret | 180/287 |
| 5,376,869 | A | * | 12/1994 | Konrad | 318/587 |
| 5,929,608 | A | | 7/1999 | Ibaraki et al. | |
| 6,236,333 | B1 | * | 5/2001 | King | 340/5.61 |

(Continued)

FOREIGN PATENT DOCUMENTS

| EP | 1177955 A2 * | 2/2002 | ............ B60R 25/04 |
| JP | 7-36504 U | 7/1995 | |

(Continued)

OTHER PUBLICATIONS

International Search Report and Written Opinion for corresponding International Application No. PCT/US2012/058930, mailed Mar. 15, 2013, 11 pages.

(Continued)

*Primary Examiner* — Redhwan k Mawari
*Assistant Examiner* — Edward Torchinsky
(74) *Attorney, Agent, or Firm* — Seed IP Law Group PLLC

(57) ABSTRACT

A vehicle has a security and anti-theft system that senses movement of the vehicle in a forward or backward direction when the vehicle is in a locked state, such as by detecting wheel rotation. Upon this detection, the security system signals the motor to counteract the wheel movement by rotating one or more wheels in the opposite direction of the direction of wheel rotation detected until the wheel rotation is no longer detected. The security and anti-theft system may determine whether the vehicle is in a locked state by detecting whether a key is present and/or by one or more communications received by an external wireless device.

18 Claims, 7 Drawing Sheets

(56) References Cited

U.S. PATENT DOCUMENTS

| | | |
|---|---|---|
| 6,515,580 B1 | 2/2003 | Isoda et al. |
| 6,593,713 B2 | 7/2003 | Morimoto et al. |
| 6,621,244 B1 | 9/2003 | Kiyomiya et al. |
| 6,751,534 B2 | 6/2004 | Robichaux et al. |
| 6,796,396 B2 | 9/2004 | Kamen et al. |
| 7,567,166 B2 | 7/2009 | Bourgine De Meder |
| 7,698,044 B2 * | 4/2010 | Prakash et al. .................. 701/82 |
| 7,979,147 B1 | 7/2011 | Dunn |
| 8,118,132 B2 | 2/2012 | Gray, Jr. |
| 8,319,605 B2 * | 11/2012 | Hassan et al. ................ 340/5.72 |
| 2001/0018903 A1 | 9/2001 | Hirose et al. |
| 2002/0023789 A1 | 2/2002 | Morisawa et al. |
| 2007/0026996 A1 | 2/2007 | Ayabe et al. |
| 2007/0208468 A1 | 9/2007 | Sankaran et al. |
| 2009/0158790 A1 * | 6/2009 | Oliver ............................ 70/202 |
| 2010/0026238 A1 | 2/2010 | Suzuki et al. |
| 2010/0051363 A1 | 3/2010 | Inoue et al. |
| 2010/0235043 A1 | 9/2010 | Seta et al. |
| 2010/0324800 A1 | 12/2010 | Hanft et al. |
| 2011/0120789 A1 | 5/2011 | Teraya |
| 2011/0292667 A1 | 12/2011 | Meyers |
| 2011/0295454 A1 | 12/2011 | Meyers |
| 2012/0000720 A1 | 1/2012 | Honda et al. |
| 2012/0105078 A1 | 5/2012 | Kikuchi et al. |
| 2012/0123661 A1 | 5/2012 | Gray, Jr. |
| 2012/0126969 A1 | 5/2012 | Wilbur et al. |
| 2012/0293313 A1 | 11/2012 | Yu et al. |
| 2013/0026971 A1 | 1/2013 | Luke et al. |
| 2013/0026972 A1 | 1/2013 | Luke et al. |
| 2013/0026973 A1 | 1/2013 | Luke et al. |
| 2013/0027183 A1 | 1/2013 | Wu et al. |
| 2013/0030580 A1 | 1/2013 | Luke et al. |
| 2013/0030581 A1 | 1/2013 | Luke et al. |
| 2013/0030608 A1 | 1/2013 | Taylor et al. |
| 2013/0030630 A1 | 1/2013 | Luke et al. |
| 2013/0030696 A1 | 1/2013 | Wu et al. |
| 2013/0030920 A1 | 1/2013 | Wu et al. |
| 2013/0031318 A1 | 1/2013 | Chen et al. |
| 2013/0033203 A1 | 2/2013 | Luke et al. |
| 2013/0090795 A1 | 4/2013 | Luke et al. |
| 2013/0093271 A1 | 4/2013 | Luke et al. |
| 2013/0093368 A1 | 4/2013 | Luke et al. |
| 2013/0119898 A1 | 5/2013 | Ohkura |
| 2013/0181582 A1 | 7/2013 | Luke et al. |
| 2013/0345935 A1 | 12/2013 | Chang |
| 2014/0320046 A1 | 10/2014 | Luke et al. |

FOREIGN PATENT DOCUMENTS

| | | |
|---|---|---|
| JP | 2005-067453 | 3/2005 |
| JP | 2010-179764 A | 8/2010 |
| KR | 1998-045020 U | 9/1998 |
| KR | 2004-0005146 A | 1/2004 |
| KR | 100971278 B1 | 7/2010 |

OTHER PUBLICATIONS

Luke et al., "Detectible Indication of an Electric Motor Vehicle Standby Mode," Office Action for U.S. Appl. No. 13/646,320, mailed May 30, 2013, 13 pages.

Chen et al., "Apparatus, Method and Article for Providing Vehicle Diagnostic Data," U.S. Appl. No. 61/601,404, filed Feb. 21, 2012, 56 pages.

Luke et al., "Apparatus, Method and Article for Authentication, Security and Control of Power Storage Devices, Such As Batteries," U.S. Appl. No. 61/534,761, filed Sep. 14, 2011, 55 pages.

Luke et al., "Apparatus, Method and Article for Authentication, Security and Control of Power Storage Devices, Such as Batteries, Based on User Profiles," U.S. Appl. No. 61/534,772, filed Sep. 14, 2011, 55 pages.

Luke et al., "Apparatus, Method and Article for Collection, Charging and Distributing Power Storage Devices, Such as Batteries," U.S. Appl. No. 61/511,900, filed Jul. 26, 2011, 73 pages.

Luke et al., "Apparatus, Method and Article for Collection, Charging and Distributing Power Storage Devices, Such as Batteries," U.S. Appl. No. 61/647,936, filed May 16, 2012, 76 pages.

Luke et al., "Apparatus, Method and Article for Redistributing Power Storage Devices, Such as Batteries, Between Collection, Charging and Distribution Machines," U.S. Appl. No. 61/534,753, filed Sep. 14, 2011, 65 pages.

Luke et al., "Dynamically Limiting Vehicle Operation for Best Effort Economy," U.S. Appl. No. 61/511,880, filed Jul. 26, 2011, 52 pages.

Luke et al., "Thermal Management of Components in Electric Motor Drive Vehicles," U.S. Appl. No. 61/647,941, filed May 16, 2012, 47 pages.

Luke et al., "Thermal Management of Components in Electric Motor Drive Vehicles," U.S. Appl. No. 61/511,887, filed Jul. 26, 2011, 44 pages.

Luke et al., "Detectible Indication of an Electric Motor Vehicle Standby Mode," U.S. Appl. No. 61/543,720, filed Oct. 5, 2011, 35 pages.

Luke et al., "Detectible Indication of an Electric Motor Vehicle Standby Mode," U.S. Appl. No. 61/684,432, filed Aug. 17, 2012, 41 pages.

Taylor et al., "Apparatus, Method and Article for Physical Security of Power Storage Devices in Vehicles," U.S. Appl. No. 61/557,170, filed Nov. 8, 2011, 60 pages.

Wu et al., "Apparatus, Method and Article for a Power Storage Device Compartment," U.S. Appl. No. 61/581,566, filed Dec. 29, 2011, 61 pages.

Wu et al., "Apparatus, Method and Article for Providing Information Regarding Availability of Power Storage Devices at a Power Storage Device Collection, Charging and Distribution Machine," U.S. Appl. No. 61/601,953, filed Feb. 22, 2012, 53 pages.

Wu et al., "Apparatus, Method and Article for Providing Locations of Power Storage Device Collection, Charging and Distribution Machines," U.S. Appl. No. 61/601,949, filed Feb. 22, 2012, 56 pages.

Wu et al., "Apparatus, Method and Article for Security of Vehicles," U.S. Appl. No. 61/557,176, filed Nov. 8, 2011, 37 pages.

International Search Report and Written Opinion for corresponding International Patent Application No. PCT/US2012/063979 mailed Mar. 4, 2013, 10 pages.

Luke et al., "Detectible Indication of an Electric Motor Vehicle Standby Mode," Notice of Allowance mailed Apr. 10, 2014, for U.S. Appl. No. 13/646,320, 8 pages.

Luke et al., "Detectible Indication of an Electric Motor Vehicle Standby Mode," Office Action mailed Jan. 28, 2015, for U.S. Appl. No. 14/328,564, 9 pages.

Luke et al., "Detectible Indication of an Electric Vehicle Standby Mode," Office Action for U.S. Appl. No. 14/328,564, mailed Aug. 3, 2015, 13 pages.

* cited by examiner

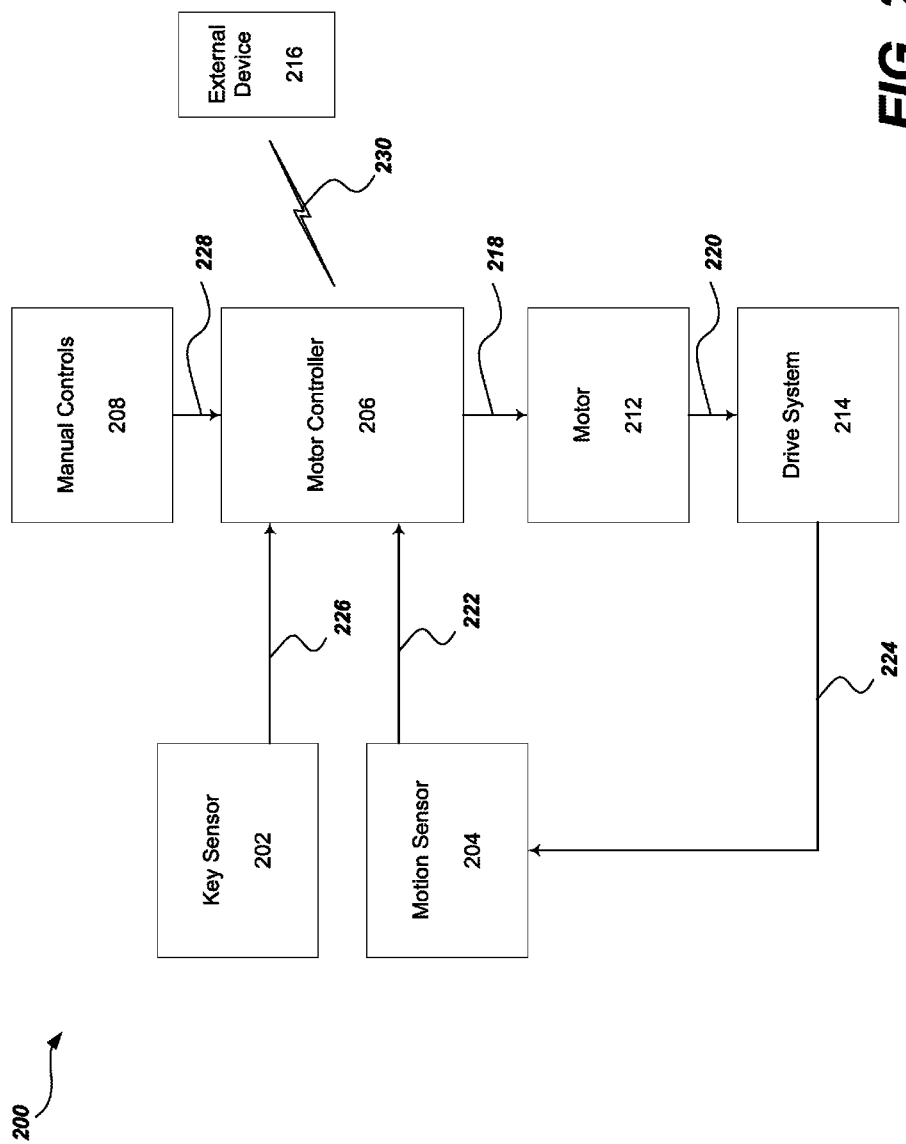

US 9,248,806 B2

APPARATUS, METHOD AND ARTICLE FOR SECURITY OF VEHICLES

BACKGROUND

1. Technical Field

The present disclosure generally relates to security of vehicles, and particularly to prevention of vehicle theft.

2. Description of the Related Art

There are a wide variety of uses or applications for portable electrical power storage devices.

One such application is in the field of transportation. Hybrid and all-electric vehicles are becoming increasingly common. Such vehicles may achieve a number of advantages over traditional internal combustion engine vehicles. For example, hybrid or electrical vehicles may achieve higher fuel economy and may have little or even zero tail pipe pollution. In particular, all-electric vehicles may not only have zero tail pipe pollution, but may be associated with lower overall pollution. For example, electrical power may be generated from renewable sources (e.g., solar, hydro). Also for example, electrical power may be generated at generation plants that produce no air pollution (e.g., nuclear plants). Also for example, electrical power may be generated at generation plants that burn relatively "clean burning" fuels (e.g., natural gas), which have higher efficiency than internal combustion engines, and/or which employ pollution control or removal systems (e.g., industrial air scrubbers) which are too large, costly or expensive for use with individual vehicles.

Personal transportation vehicles such as combustion engine powered scooters and/or motorbikes are ubiquitous in many places, for example in the many large cities of Asia. Such scooters and/or motorbikes tend to be relatively inexpensive, particular as compared to automobiles, cars or trucks. Cities with high numbers of combustion engine scooters and/or motorbikes also tend to be very densely populated and suffer from high levels of air pollution. When new, many combustion engine scooters and/or motorbikes are a relatively low polluting source of personal transportation. For instance, such scooters and/or motorbikes may have higher mileage ratings than larger vehicles. Some scooters and/or motorbikes may even be equipped with basic pollution control equipment (e.g., catalytic converter). Unfortunately, factory specified levels of emission are quickly exceeded as the scooters and/or motorbikes are used and either not maintained and/or as the scooters and/or motorbikes are modified, for example by intentional or unintentional removal of catalytic converters. Often owners or operators of scooters and/or motorbikes lack the financial resources or the motivation to maintain their vehicles.

It is known that air pollution has a negative effect on human health, being associated with causing or exacerbating various diseases (e.g., various reports tie air pollution to emphysema, asthma, pneumonia, cystic fibrosis as well as various cardiovascular diseases). Such diseases take large numbers of lives and severely reduce the quality of life of countless others.

Thus, use of hybrid or all electric vehicles may help diminish these negative environmental effects. However, owners or renters of electric vehicles such as electric scooters or motorbikes may often experience theft or compromised security of their vehicles due to their higher value and more expensive components.

BRIEF SUMMARY

A vehicle security system for a vehicle may be summarized as including at least one controller; and at least one communications module coupled to the at least one controller, wherein the at least one controller is configured to: receive information indicating whether the vehicle is in a state to allow operation of the vehicle; and in response to receiving the information whether the vehicle is in a state to allow operation of the vehicle, make a determination of whether to allow one or more wheels of the vehicle to roll based on the received information indicating whether the vehicle is in a state to allow operation of the vehicle.

The vehicle security system wherein the at least one controller may be further configured to: prevent the one or more wheels from rotating if the received information indicating whether the vehicle is in a state to allow operation of the vehicle indicates the vehicle is not in a state to allow operation of the vehicle.

The vehicle security system wherein the at least one controller may be configured to prevent the one or more wheels from rolling by being configured to: detect rotation of the one or more wheels in a first direction; and send a signal to a motor of the vehicle to rotate at least one of the one or more wheels in a second direction opposite of the first direction until the at least one controller no longer detects the rotation of the one or more wheels in the first direction.

The vehicle security system wherein the at least one controller may be configured to detect the motion of the one or more wheels in the first direction by being configured to: receive a motion detection signal from a motion sensor operably coupled to a drive system of the vehicle.

The vehicle security system wherein the at least one controller may be configured to detect the motion of the one or more wheels in the first direction by being configured to: receive a motion detection signal from a motion sensor configured to detect motion by using global positioning system data regarding location of the vehicle.

The vehicle security system may further include the motion sensor operably coupled to the at least one controller. The received information indicating whether the vehicle is in a state to allow operation of the vehicle may be information received indicating whether a key is present in an ignition of the vehicle and wherein the at least one controller is configured to prevent the one or more wheels from rolling if the received information indicates a key is not present in the ignition. The received information indicating whether the vehicle is in a state to allow operation of the vehicle may be information received wirelessly regarding authentication of an external device received via the communications module, and wherein the at least one controller is configured to allow the one or more wheels to roll if the received information indicates the external device is authenticated and prevent the one or more wheels from rolling if the received information indicates the external device is not authenticated or indicates no external device is detected. The external device may be a key fob. The external device may be a mobile device.

The vehicle security system wherein the at least one controller may be configured to determine whether the received information indicates the external device is authenticated by being configured to: generate a challenge key to send to the external device; send the challenge key to the external device; receive a response from the external device to the sending of the challenge key, the response including a response code as part of the received information; generate an output from a secret algorithm using a secret key and the response code as input, the secret algorithm and the secret key configured to be known only to the vehicle security system and one or more authorized external devices; and compare the output from the secret algorithm to the response code, and wherein the at least one controller is configured to determine whether received information indicates the external device is authenticated based at least on the comparison. The at least one controller may be coupled to a motor of the vehicle. The vehicle may be an electric two-wheeled vehicle.

The vehicle security system wherein the at least one controller may be configured to prevent the one or more wheels from rolling by being configured to: detect motion of the vehicle in a first direction by being configured to receive a motion detection signal from a motion sensor; and send a signal to a motor of the vehicle to rotate at least one of the one or more wheels in a second direction associated with moving the vehicle in a direction opposite of the first direction until the at least one controller no longer detects the motion of the vehicle in the first direction from the motion sensor. The motion sensor may be operably coupled to the at least one controller and may be configured to detect the motion in the first direction via an accelerometer of the motion sensor.

A method of operating a vehicle security system for a vehicle may be summarized as including receiving information indicating whether the vehicle is in a state to allow operation of the vehicle; and preventing one or more wheels of the vehicle from rotating if the received information indicating whether the vehicle is in a state to allow operation of the vehicle indicates the vehicle is not in a state to allow operation of the vehicle. The state to allow operation of the vehicle may be a state in which a key is present in an ignition of the vehicle. The state to allow operation of the vehicle may be a state in which an authorized external device has been wirelessly authenticated by the vehicle security system.

The method wherein the preventing the one or more wheels of the vehicle from rolling may include detecting rotation of the one or more wheels in a first direction; and sending a signal to a motor of the vehicle to rotate at least one of the one or more wheels in a second direction opposite of the first direction until the at least one controller no longer detects the rotation of the one or more wheels in the first direction.

A vehicle may be summarized as including a motor; at least two wheels operably coupled to the motor; a motor controller operably coupled to the motor; one or more driver controls operably coupled to the motor controller, and wherein the motor controller includes a vehicle security system configured to: receive information indicating whether the vehicle is in a state to allow operation of the vehicle; and in response to receiving the information whether the vehicle is in a state to allow operation of the vehicle, make a determination of whether to allow one or more wheels of the vehicle to roll based on the received information indicating whether the vehicle is in a state to allow operation of the vehicle.

The vehicle wherein the vehicle security system may be configured to prevent the one or more wheels from rolling by being configured to: detect rotation of one or more of the at least two wheels in a first direction; and send a signal to a motor of the vehicle to rotate at least one of the at least two wheels in a second direction opposite of the first direction until the vehicle security system no longer detects the rotation of the one or more of the at least two wheels in the first direction.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 2 is a block diagram of the vehicle security system of the vehicle of FIG. 1A and FIG. 1B, according to one non-limiting illustrated embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with vending apparatus, batteries, locking mechanisms, wireless technologies, supercapacitors or ultracapacitors, power converters including but not limited to transformers, rectifiers, DC/DC power converters, switch mode power converters, controllers, and communications systems and structures and networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

The headings and Abstract of the Disclosure provided herein are for convenience only and do not interpret the scope or meaning of the embodiments.

Figure 1A:
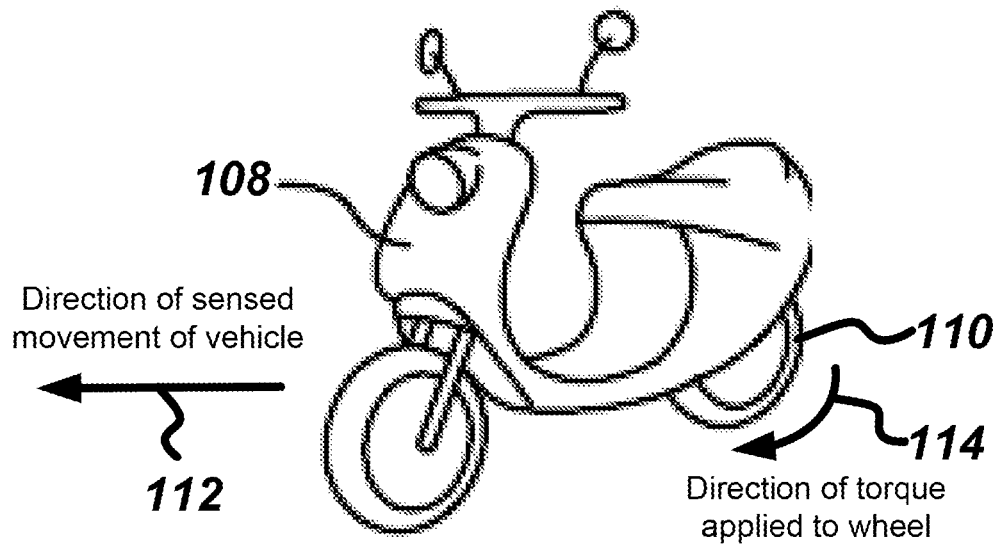
FIG. 1A is a perspective view of a vehicle being prevented by a security system of the vehicle from rolling in a first direction, according to one non-limiting illustrated embodiment.

FIG. 1A shows a perspective view of a vehicle 108 being prevented by a security system of the vehicle from rolling in a first direction, according to one non-limiting illustrated embodiment.

Although FIG. 1A shows an electric scooter or motorbike, the vehicle 108 may be any powered vehicle or powered device with at least two wheels, including motorcycles cars, trucks, airplanes, trains, tractors, utility vehicles, maintenance vehicles, powered toys, etc. The vehicle 108 has a security system (shown in FIG. 2) that senses movement of the vehicle forward 112 when the vehicle is in a state that is not to allow operation of the vehicle (i.e., a "locked state"). This locked state may include or be triggered by a number of factors, including, but not limited to: when a key is not detected as being in the ignition, when a vehicle has been manually switched into a "locked" state by a user, when an authorized wireless external device such as a key fob or mobile device has not been detected by the vehicle security system (either immediately or over a particular period of time, etc.).

Detection of the movement may be, for example, by detection of rotation of at least one wheel 110 in a first direction associated with movement of the vehicle forward 112. For example, movement of a front wheel and/or a back wheel of the vehicle 108 may be individually detected, such that if a thief lifted the vehicle 108 so that only the front wheel or back wheel was rolling, this movement of the vehicle would also be detected. However, detection may be via other motion sensors of the vehicle security system, including those using accelerometers, and global positioning system (GPS) data, etc., of the vehicle security system. For example, the motion sensor may be configured to detect motion by using global positioning system data regarding location of the vehicle. Upon the detection of the movement forward 112 (e.g., by detection of rotation of the at least one wheel 110 in the first direction), the vehicle security system causes the wheel 110 to rotate in a second direction opposite of the first direction (counteracting the rotation of the at least one wheel 110 in the first direction) until the vehicle security system no longer detects the rotation of the at least one wheel 110 in the first direction. In an embodiment in which a motion sensor, such as one using an accelerometer or GPS data, is used by the vehicle security system to detect movement of the vehicle 108 forward 112, the vehicle security system causes the at least one wheel 110 to rotate in the second direction opposite of the first direction (counteracting any rotation of the wheel in the first direction) until the vehicle security system no longer detects the movement forward by the motion sensor. In this manner, the at least one wheel 110 is prevented from rotating in the first direction when the vehicle is in the locked state. The vehicle security system thus hinders forward 112 rolling of the vehicle 108 to avoid theft and tampering of the vehicle 108 when the vehicle is in the locked state. Thus, the vehicle security system also prevents unintended forward rolling of the vehicle downhill or due to accidental bumping of the vehicle 108.

Figure 1B:
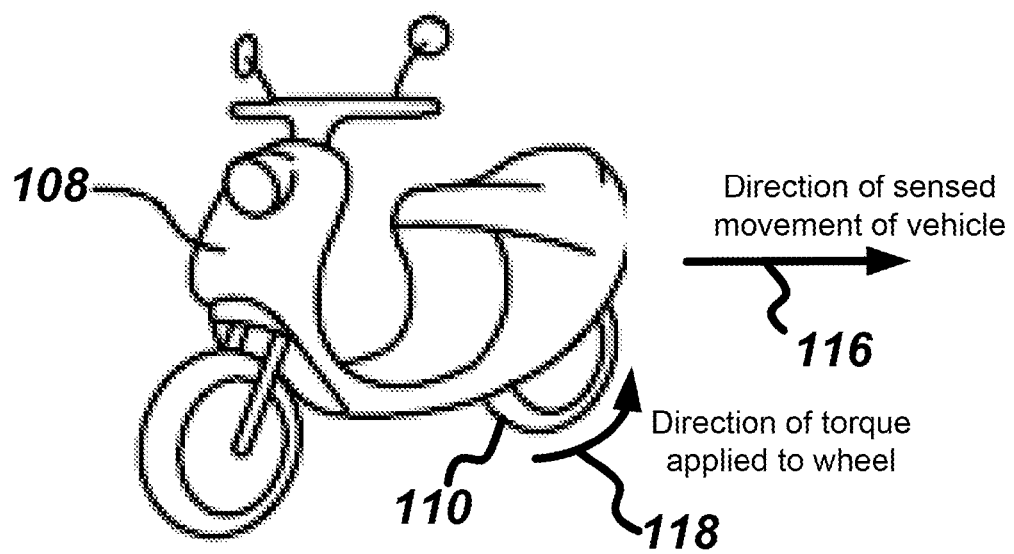
FIG. 1B is a perspective view of the vehicle of FIG. 1A being prevented by a vehicle security system of the vehicle from rolling in a second direction, according to one non-limiting illustrated embodiment.

FIG. 1B shows perspective view of the vehicle 108 of FIG. 1A being prevented by the vehicle security system of the vehicle 108 from rolling in a second direction, according to one non-limiting illustrated embodiment.

As shown in FIG. 2B, detection by the vehicle security system may be of backward movement 116 of the vehicle 108. For example, this detection of backward movement 116 may be by the vehicle security system detecting rotation of the at least one wheel 110 in a second direction opposite of the first direction associated with movement of the vehicle 108 forward 112. However, detection of movement may be via other motion sensors of the vehicle security system, including those using accelerometers, etc., of the vehicle security system. Upon the detection of the backward movement 116 (e.g., by detection of rotation of the at least one wheel 110 in the second direction opposite of the first direction), the vehicle security system causes the at least one wheel 110 to rotate in the first direction opposite of the second direction (counteracting the rotation of the wheel in the second direction) until the vehicle security system no longer detects the rotation of the at least one wheel 110 in the second direction. In an embodiment in which a motion sensor, such as one using an accelerometer, is used by the vehicle security system to detect backward movement 116 of the vehicle 108, the vehicle security system causes the at least one wheel 110 to rotate in the first direction opposite of the second direction (counteracting any rotation of the wheel in the second direction) until the vehicle security system no longer detects the movement forward by the motion sensor. In this manner, the at least one wheel 110 is also prevented from rotating in the second direction when the vehicle 108 is in the locked state, and thus the vehicle security system hinders both backward 116 and forward 112 rolling of the vehicle 108 to avoid theft and tampering of the vehicle 108 when the vehicle is in the locked state. Thus, the vehicle security system also prevents unintended backward rolling of the vehicle downhill or due to accidental bumping of the vehicle 108.

FIG. 2 shows a block diagram of the vehicle security system 200 of the vehicle 108 of FIG. 1A and FIG. 1B, according to one non-limiting illustrated embodiment.

Shown is a key sensor 202, a motion sensor 204, a motor controller 206, manual controls 208, a motor 212, a drive system 214, and an external device 216. The motor controller 206 has an input 226 from the key sensor 202, an input 222 from the motion sensor 204 and an input 228 from the manual controls 208. The motor 212 has an input 218 from the motor controller 206 and the drive system 214 has an input 220 from the motor 212. The motion sensor 204 also has an input 224 from the drive system 214. Also, the external device 216 is a wireless device that is in operable wireless communication with the motor controller 206 via a wireless signal 230. One or more of the connections between the components in the vehicle security system 200 may be logical or physical connections and communication between the components of the vehicle security system 200 may be via any operable combination of analog, digital, wired or wireless signals.

The motor controller 206 is configured to control operation the motor 212 in one or more of a first direction and a second direction based on input received from the manual controls 208, key sensor 202, motion sensor 204 and/or external device 216. The motor 212 is configured to run the drive system 214 in order to rotate one or more wheels (e.g., the at least one wheel 110 shown in FIG. 1A and FIG. 1B) of the vehicle 108 corresponding to a direction in which the motor 212 is running according to the input received from the motor controller 206. The drive system 214, for example, may include components (e.g., a transmission or other mechanical components) to transmit power from the motor to the one or more wheels.

The motion sensor 204 is configured to detect movement of the vehicle 108 in a forward and/or backward direction. In one embodiment, this detection of the movement may be, for example, by detection of rotation of at least one wheel in a first direction associated with movement of the vehicle forward. Also, movement of a front wheel and/or a back wheel of the vehicle 108 may be individually detected, such that if a thief lifted the vehicle 108 so that only the front wheel or back wheel was rolling, this movement of the vehicle would also be detected. Detection of rotation of the at least one wheel, may be via the input 224 from the drive system 214. The input 224 may be mechanical or electronic. For example, the drive system 214 may include a separate drive cable, or shared drive cable of a speedometer, tachometer, or odometer of the vehicle 108 connected to a set of gears in the transmission of the drive system 214, so that when the at least one wheel of the vehicle rotates, the gears turn a mandrel inside a flexible shaft of the drive cable. For example, the drive cable may be connected to the motion sensor 204 as the input line 224. The direction of rotation of the mandrel thus communicates the corresponding direction of the rotation of the at least one wheel to the motion sensor 204. In other embodiments, the drive cable may be driven directly by rotation of the at least one wheel or wheel axle (including that of either a front wheel or a back wheel) via a gear assembly (not shown) operably coupled to the drive cable and wheel or axle. In yet other embodiments, a mechanical or electric wheel rotation detection system may be coupled directly to and driven directly by one or more other wheels or wheel axles, or to a wheel or wheel axle that is not operably coupled to the drive system 214 (including that of a front wheel or a back wheel).

Any method or system for mechanically or electrically, or electronically detecting the direction of rotational movement of a wheel of a vehicle may be used, including those systems using an electric rotation sensor mounted in the transmission of the drive system 214 that delivers a series of electronic pulses whose frequency or amplitude correspond to the direction of rotation the driveshaft of the drive system 214 or wheel axle. Also, detection of wheel rotation may be made by the motion sensor 204 mechanically and/or electronically detecting rotation or phase change of the motor 212. The rotation or phase change of the motor 212 may be caused by the drive system 214 being mechanically coupled to the wheel and the motor, or in some embodiments, the wheel being directly coupled to the axle or armature of the motor 212. Thus, the rotation of the motor 212 causes rotation of the wheel and, vice versa, the rotation of the wheel may cause rotation or phase change of the motor 212. Any method or system that mechanically, electrically or electronically detects rotational movement or phase change of the motor 212, and/or the direction thereof, may be used. For example, the motion sensor 204, being electronically and/or mechanically coupled directly or indirectly to the motor 212 and/or drive system 214, may directly or indirectly detect changes or disturbances in magnetic fields caused by the rotation or phase change of the motor 212 or detect electrical current caused by the rotation or phase change of the motor 212. The properties of the detected disturbances in magnetic fields caused by the rotation or phase change of the motor 212 and/or the properties of the electrical current caused by the rotation or phase change of the motor 212 (e.g., the direction of the electrical current) may correspond to, and thus indicate to the motion sensor 204, the direction of the rotation of the wheel. The motion sensor 204 being electronically and/or mechanically coupled directly to the motor 212 may be represented by another connection line (not shown) in FIG. 2 between the motion sensor 204 and the motor 214.

In other embodiments, when the vehicle 108 goes into a locked state an electronic or mechanical switch (not shown) within of the motion sensor 204, or coupled to an input of the motion sensor 204, and coupled to the motor 212 may electronically or mechanically be set to one state by the motor controller 206 or manual controls 208. This switch may then be mechanically or electronically switched to another state caused by the rotation or phase change of the motor 212.

Also included may be systems that otherwise use sensors to sense magnetic fields, as the at least one wheel rotates, of one or more magnets coupled to the at least one wheel (including a front wheel or a back wheel). However, detection by the motion sensor 204 may be via other sensors of the motion sensor 204, including one or more accelerometers, a sensor configured to detect motion by GPS data regarding location of the vehicle, etc., to detect movement and/or direction of movement of the vehicle. Upon the detection of the movement forward or backward (e.g., by detection of rotation of the at least one wheel in the first direction or the second direction), the motion sensor 204 communicates the current direction of movement to the motor controller 206.

If the vehicle 108 is in a locked state, the motor controller 206 may then send a signal via the input 218 to the motor 212 to operate the drive system 214 to rotate (i.e., apply torque to) the at least one wheel (including, in various embodiments having various different drive systems, applying torque to the front wheel, back wheel and/or all wheels) in a direction opposite of that detected by the motion sensor (counteracting any rotation of the at least one wheel) until the motor controller 206 no longer receives input from the motion sensor regarding the movement of the vehicle by the motion sensor 204, or until the motion sensor 204 communicates to the motor controller 206 that the vehicle 108 is no longer moving forward or backward. For example, the input 220 may be a mechanical input or mechanical connection between the motor 212 and the drive system that causes the drive system 214 to rotate the at least one wheel of the vehicle 108 in the appropriate direction.

The motor controller 206 is configured to receive information regarding whether the vehicle is in a locked state from one or more of the key sensor 202, the manual controls 208 and/or the external device 216. For example, the key sensor 202 may detect an electrical signal caused by a physical key being placed in an ignition or other key hole in the vehicle 108, or by otherwise detecting a physical key being present in the vehicle 108. The key sensor 202 may then communicate this via input 226 to the controller to indicate that the vehicle 108 is not in a locked state. The key sensor 202 may also or instead communicate the absence of a key via input 226 to the motor controller 206 to indicate that the vehicle 108 is in a locked state. Various manual controls 208 of the vehicle 108 such as switches or buttons operated or enabled by keys, etc., may also be used to indicate via input 228 to the motor controller 206 whether the vehicle 108 is in a locked state.

A wireless external device 216 including, but not limited to: card keys, access cards, credit cards, access control key fobs, mobile computing devices, cellular telephones, personal digital assistants (PDAs), smart phones, battery chargers, other access control devices, etc., may be used to communicate over a wireless signal 230 to indicate whether the vehicle 108 is in a locked state and/or to communicate authentication information of the external device 216 and/or the motor controller 206. The external device 216 may include a communications subsystem (not shown), for example, a communications subsystem including components enabling short range (e.g., via Bluetooth, near field communication (NFC), radio frequency identification (RFID) components and protocols) or longer range wireless communications (e.g., over a wireless LAN, satellite, or cellular network). The communications subsystem of the external device 216 may include one or more modems or one or more Ethernet or other types of communications cards or components for doing so to communicate with the motor controller 206. Also, the absence of the wireless signal 230 (either immediately, or over a period of time) authorizing or indicating the motor controller is in an unlocked state, or putting the vehicle 108 into an unlocked state may cause the motor controller 206 to automatically determine that the vehicle 108 is in a locked state.

In some embodiments, the wireless signal 230 received from the external device 216 may include a code that may be authenticated by the motor controller 206 in order to ensure the signal 230 is being received from an authorized device. For example, the code may be time-sensitive code such as a "hopping" code or a "rolling" code to provide such security. In the case of a 40-bit rolling code, forty bits provide $2^{40}$ (about 1 trillion) possible codes. However, codes of other bit lengths may be used instead. The external device 216 memory (e.g., ROM 312) may hold the current 40-bit code. The external device 216 then sends that 40-bit code to the motor controller 206 for the motor controller 206 to determine whether the vehicle 108 is in an unlocked state. The motor controller 206 also holds the current 40-bit code. If the motor controller 206 receives the 40-bit code it expects, it then determines the vehicle 108 is in an unlocked state. If the motor controller 206 does not receive the 40-bit code it expects, it then determines the vehicle 108 is in a locked state. In some embodiments, the motor controller 206 determines the vehicle 108 is in a locked state if the motor controller 206 does not receive the 40-bit code it expects, or is not able to receive any authorized or authenticated wireless signal 230 over a determined period of time.

Both the external device 216 and the motor controller 206 use the same pseudo-random number generator (e.g., implemented by the respective processors of the external device 216 and the motor controller 206) to generate the 40-bit code. When the motor controller 206 receives a valid code form the external device 216, it uses the same pseudo-random number generator to generate the next code relative to the valid code received and communicates wirelessly with the external device 216 to instruct it to also generate the next code using the same pseudo-random number generator, which the external device 216 stores for the next use. In this way, the external device 216 and the motor controller 206 are synchronized. In some embodiments, the motor controller 206 only determines the vehicle 108 is in an unlocked state if it receives the code it expects.

In some embodiments, the motor controller 206 may accept any of the next 256 possible valid codes in the pseudo-random number sequence. This way, if the motor controller 206 and the external device 216 for some reason become unsynchronized by 256 rolling codes or less, the motor controller 206 would still accept the transmission from the external device 216, and generate the next code relative to the valid code received.

In some embodiments, the motor controller 206 and the external device 216 store a common secret key or code and use a common secret algorithm for authentication of the external device 216. The common secret algorithm, for example, can be a hash function or other algorithm which takes the secret key and at least one other key or code as input and generates different output based on the secret key and different input. The common secret algorithm may be executed by respective processors of the motor controller 206 and the external device 216 using stored instructions on respective computer readable media of the motor controller 206 and the external device 216 or on respective configured hardware or firmware components of the of motor controller 206 and external device 216. The common secret algorithm and common secret key or code may be initially encoded, programmed or installed in the motor controller 206 and external device 216 in a secure fashion such that they are irretrievable or otherwise protected from being discovered. The common secret algorithm and common secret key or code are not communicated between the motor controller 206 and external device 216 during the authentication process.

In response to receiving an authentication beacon or request from the external device 216 via the wireless signal 230 (which may have been sent in response to a wireless signal or beacon received from the motor controller 206), the motor controller 206 generates a challenge key and sends this challenge key to the external device 216. In response to receiving the challenge key, the external device 216 uses the secret algorithm and the common secret key to generate a response value and sends this response value to the motor controller 206. The motor controller 206 then verifies the response value by using the generated challenge key and secret key as input to the secret algorithm to generate an output value from the secret algorithm. The motor controller 206 then compares this output value from the secret algorithm to the response value received from the external device 216. If the output from the secret algorithm generated by the motor controller 206 and the response value received from the external device 216 match, then the external device 216 is authenticated and the motor controller 206 may then take actions accordingly, such as determining the vehicle 108 is in an unlocked state. If the output from the secret algorithm generated by the motor controller 206 and the response value received from the external device 216 do not match, then the external device 216 is not authenticated and the motor controller 206 may then take no action, or take other actions accordingly, such as determining the vehicle 108 is in a locked state. In some embodiments, the particular action to take (e.g., determining that the vehicle 108 is in a locked state, or determining that the vehicle 108 is in an unlocked state) may be sent as a lock or unlock command from the external device 216 along with the authentication information.

If the motor controller 206 determines the vehicle 108 is not in a locked state, the motor controller 206 will ignore the input received from the motion sensor 204 sent for purposes of counteracting wheel movement. Also, in some embodiments, the motion sensor 204 will be configured to not operate at all unless the vehicle 108 is in an unlocked state.

Figure 3:
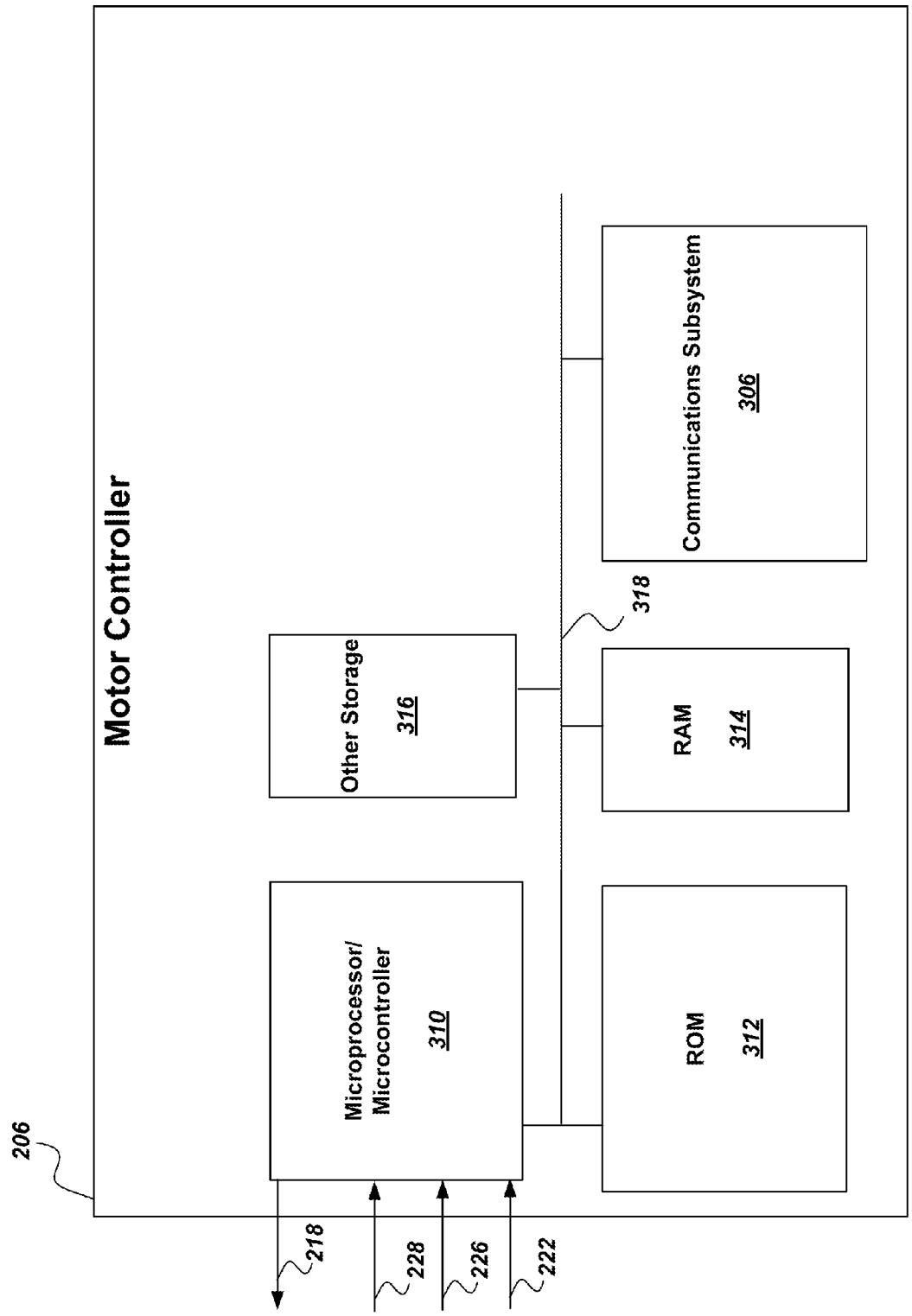
FIG. 3 is a schematic view of a motor controller of the vehicle security system of FIG. 2, according to one non-limiting illustrated embodiment.

FIG. 3 is a schematic view diagram of the motor controller 206 of the vehicle security system 200 of FIG. 2, according to one non-limiting illustrated embodiment.

The motor controller 206 includes a controller 310, a communications subsystem 306, and a power interface 420.

The controller 310, for example, is a microprocessor, microcontroller, programmable logic controller (PLC), programmable gate array (PGA), application specific integrated circuit (ASIC) or another controller capable of receiving signals from various sensors, performing logical operations, and sending signals to various components. Typically, the controller 310 may take the form of a microprocessor (e.g., INTEL, AMD, ATOM). The motor controller 206 may also be coupled to one or more non-transitory processor- or computer-readable storage media, for example read only memory (ROM) 312, random access memory (RAM) 314, and other storage 316 (e.g., solid-state storage media such as flash memory or EEPROM, or spinning storage media such as hard disk). The non-transitory processor- or computer-readable storage media 312, 314, 316 may be in addition to any non-transitory storage medium (e.g., registers) which is part of the controller 310. The motor controller 206 may include one or more buses 318 (only one illustrated) coupling various components together, for example one or more power buses, instruction buses, data buses, etc. As shown, the controller includes inputs 228 from the manual controls 208, input 222 from the motion sensor, and input 226 from the key sensor 202 (shown in FIG. 2).

As illustrated, the ROM 312, or some other one of the non-transitory processor- or computer-readable storage media 312, 314, 316, stores instructions and/or data or values for variables or parameters. The sets of data may take a variety of forms, for example a lookup table, a set of records in a database, etc. The instructions and sets of data or values are executable by the controller 310. Execution of the instructions and sets of data or values causes the controller 310 to perform specific acts to determine whether the vehicle is in a locked state based on the input received via input 228 from the manual controls 208, input 222 from the motion sensor and/or input 226 from the key sensor 202 (shown in FIG. 2). Execution of the instructions and sets of data or values also causes the controller 310 to perform specific acts to perform authentication of external devices and cause the motor controller 206 to generate control signals to drive a motor of the vehicle 108 in one or more directions. Also, such acts may include, for example, operations implementing a pseudo-random number to generate a rolling code as described above. Specific operation of the motor controller 206 is described herein and also below with reference to various flow diagrams (FIGS. 4-7).

The controller 310 may use RAM 314 in a conventional fashion, for volatile storage of instructions, data, etc. The controller 310 may use data store 316 to log or retain information, for example, information regarding current rotational direction of wheels of the vehicle, motion sensor input, information regarding currently sensed direction of movement of the vehicle, vehicle profile information, vehicle specifications, motor information and/or motor specifications, security codes, credentials, security certificates, passwords, other vehicle information, etc. The instructions are executable by the controller 310 to control operation of the motor controller 206 in response to input from remote systems such as those of external devices described herein, including those embedded in portable electronic storage device collection, charging and distribution machines.

The controller 310 may also receive signals from various sensors and/or components of an external device via the communications subsystem 306 of the motor controller 206. This information may include information that characterizes or is indicative of the authenticity, authorization level, operation, status, or condition of such components and/or external devices.

The communications subsystem 306 may include one or more communications modules or components which facilitate communications with the various components of the external device 216 of FIG. 2 (e.g., such as to receive a security code) and/or of other external devices and also, such that data may be exchanged between the motor controller 206 and the external device 216 for authentication purposes. The communications subsystem 306 may provide wired and/or wireless communications. The communications subsystem 306 may include one or more ports, wireless receivers, wireless transmitters or wireless transceivers to provide wireless signal paths to the various remote components or systems. The communications subsystem 306 may, for example, include components enabling short range (e.g., via Bluetooth, near field communication (NFC), radio frequency identification (RFID) components and protocols) or longer range wireless communications (e.g., over a wireless LAN, satellite, or cellular network) and may include one or more modems or one or more Ethernet or other types of communications cards or components for doing so. The remote communications subsystem 306 may include one or more bridges or routers suitable to handle network traffic including switched packet type communications protocols (TCP/IP), Ethernet or other networking protocols.

Figure 4:
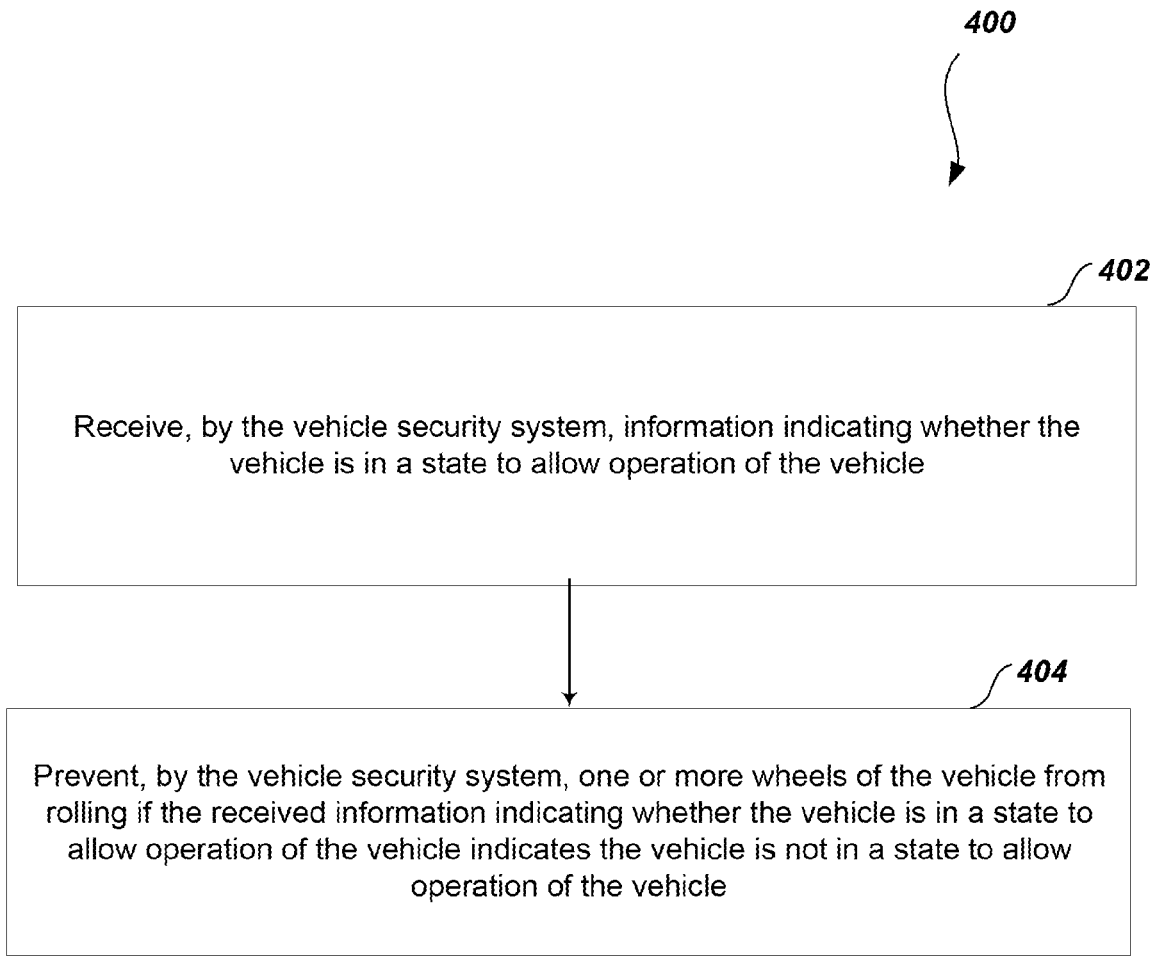
FIG. 4 is a flow diagram showing a high level method of operating the vehicle security system of FIG. 2, according to one non-limiting illustrated embodiment.

FIG. 4 shows a high level method 400 of operating the vehicle security system 200 of FIG. 2, according to one nonlimiting illustrated embodiment.

At 402, the vehicle security system 200 receives information indicating whether the vehicle is in a state to allow operation of the vehicle.

At 404, the vehicle security system 200 prevents one or more wheels of the vehicle from rolling if the received information indicating whether the vehicle is in a state to allow operation of the vehicle indicates the vehicle is not in a state to allow operation of the vehicle.

Figure 5:
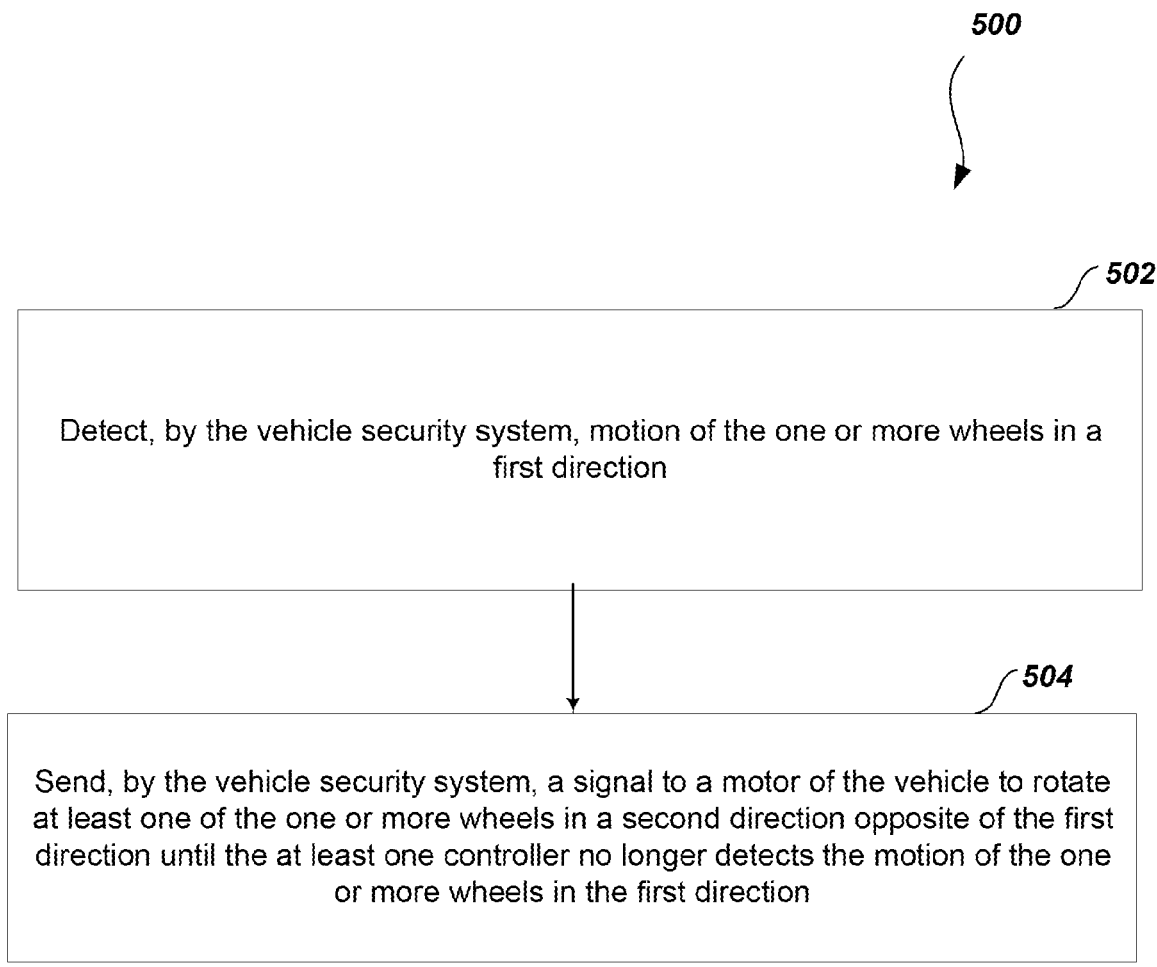
FIG. 5 is a flow diagram showing a low level method of operating the vehicle security system of FIG. 2, according to one non-limiting illustrated embodiment, including detecting rotation of one or more wheels of the vehicle, useful in the method of FIG. 4.

FIG. 5 shows a low level method 500 of operating the vehicle security system 200 of FIG. 2, according to one nonlimiting illustrated embodiment, including detecting rotation of one or more wheels of the vehicle, useful in the method 400 of FIG. 4.

At 502, the vehicle security system 200 detects motion of the one or more wheels in a first direction.

At 504, the vehicle security system 200 sends a signal to a motor of the vehicle to rotate at least one of the one or more wheels in a second direction opposite of the first direction until the at least one controller no longer detects the motion of the one or more wheels in the first direction.

Figure 6:
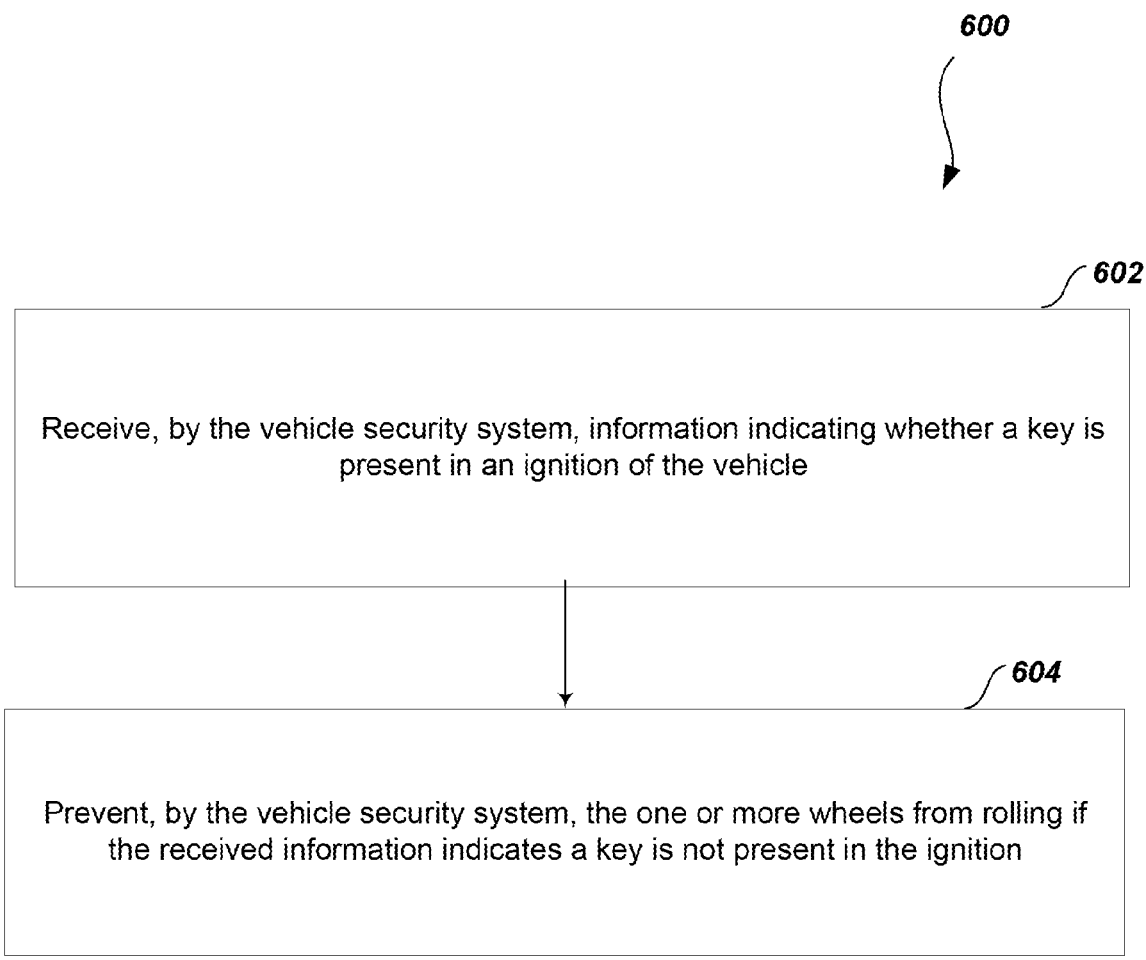
FIG. 6 is a flow diagram showing a low level method of operating the vehicle security system of FIG. 2, according to one non-limiting illustrated embodiment, including receiving information indicating whether a key is present in an ignition of the vehicle, useful in the method of FIG. 4.

FIG. 6 shows a low level method 600 of operating the vehicle security system 200 of FIG. 2, according to one nonlimiting illustrated embodiment, including receiving information indicating whether a key is present in an ignition of the vehicle, useful in the method of FIG. 4.

At 602, the vehicle security system 200 receives information indicating whether a key is present in an ignition of the vehicle.

At 604 the vehicle security system 200 prevents the one or more wheels from rolling if the received information indicates a key is not present in the ignition.

Figure 7:
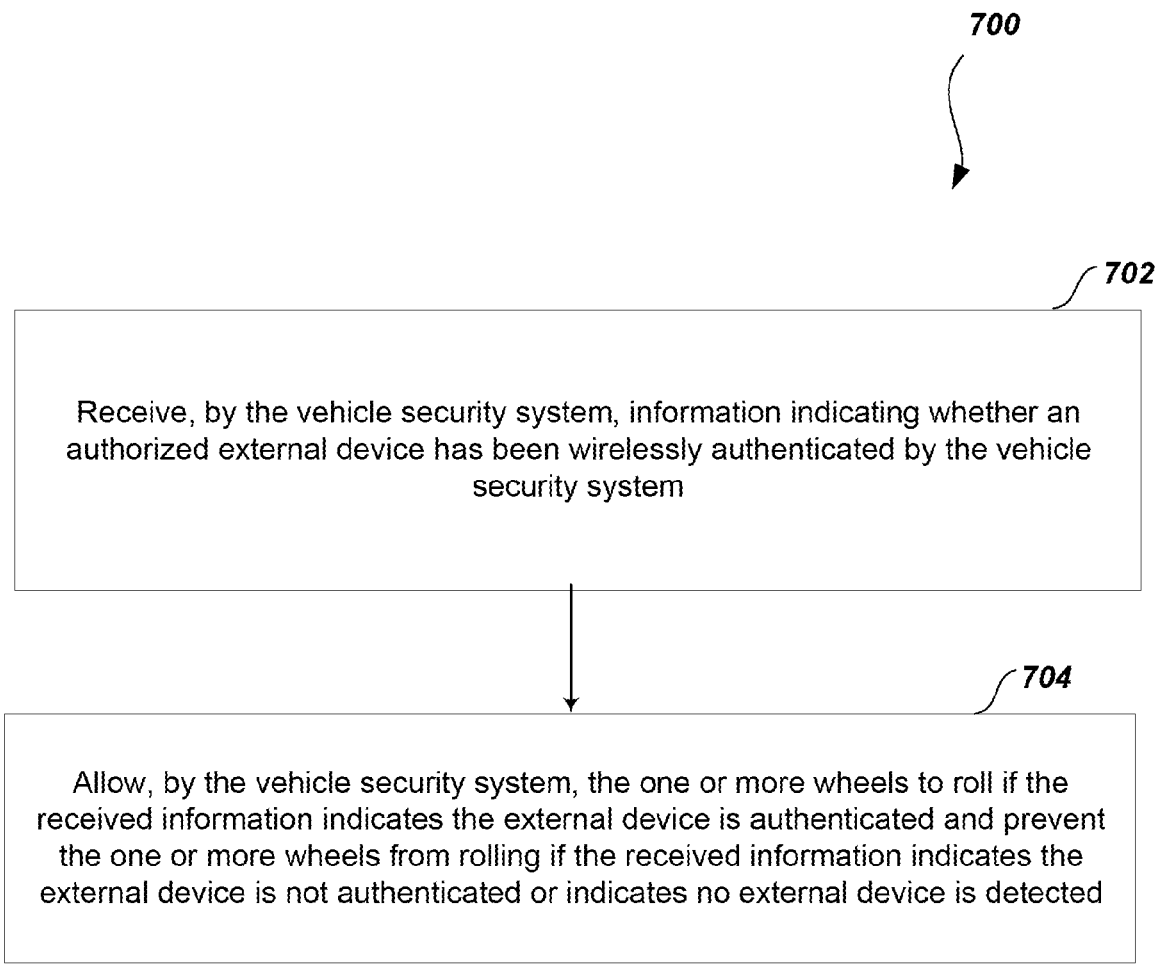
FIG. 7 is a flow diagram showing a low level method of operating the vehicle security system of FIG. 2, according to one non-limiting illustrated embodiment, including receiving information indicating whether an authorized external device has been wirelessly authenticated, useful in the method of FIG. 4.

FIG. 7 shows a low level method 700 of operating the vehicle security system 200 of FIG. 2, according to one nonlimiting illustrated embodiment, including receiving information indicating whether an authorized external device has been wirelessly authenticated, useful in the method of FIG. 4.

At 702, the vehicle security system 200 receives information indicating whether an authorized external device has been wirelessly authenticated by the vehicle security system.

At 704, the vehicle security system 200 allows the one or more wheels to roll if the received information indicates the external device is authenticated and prevents the one or more wheels from rolling if the received information indicates the external device is not authenticated, or indicates no external device is detected The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. provisional patent application Ser. No. 61/557,176 entitled "APPARATUS, METHOD AND ARTICLE FOR SECURITY OF VEHICLES" and filed Nov. 8, 2011; U.S. patent application Ser. No. 13/559,314 entitled "APPARATUS, METHOD AND ARTICLE FOR COLLECTION, CHARGING AND DISTRIBUTING POWER STORAGE DEVICES, SUCH AS BATTERIES" and filed Jul. 26, 2012; U.S. patent application Ser. No. 13/559,091 entitled "APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES" and filed Jul. 26, 2012; U.S. patent application Ser. No. 13/559,038 entitled "APPARATUS, METHOD AND ARTICLE FOR AUTHENTICATION, SECURITY AND CONTROL OF POWER STORAGE DEVICES SUCH AS BATTERIES" and filed Jul. 26, 2012; U.S. patent application Ser. No. 13/559,010 entitled "APPARATUS, METHOD AND ARTICLE FOR AUTHENTICATION, SECURITY AND CONTROL OF POWER STORAGE DEVICES, SUCH AS BATTERIES, BASED ON USER PROFILES" and filed Jul. 26, 2012; U.S. patent application Ser. No. 13/559,259 entitled "THERMAL MANAGEMENT OF COMPONENTS IN ELECTRIC MOTOR DRIVE VEHICLES" and filed Jul. 26, 2012; U.S. patent application Ser. No. 13/559,264, entitled "DYNAMICALLY LIMITING VEHICLE OPERATION FOR BEST EFFORT ECONOMY" and filed Jul. 26, 2012; U.S. patent application Ser. No. 13/559,054 entitled "APPARATUS, METHOD AND ARTICLE FOR PHYSICAL SECURITY OF POWER STORAGE DEVICES IN VEHICLES" and filed Jul. 26, 2012; U.S. patent application Ser. No. 13/559,125 entitled "APPARATUS, METHOD AND ARTICLE FOR A POWER STORAGE DEVICE COMPARTMENT" and filed Jul. 26, 2012; U.S. patent application Ser. No. 13/559,390 entitled "APPARATUS, METHOD AND ARTICLE FOR PROVIDING VEHICLE DIAGNOSTIC DATA" and filed Jul. 26, 2012; U.S. patent application Ser. No. 13/559,333 entitled "APPARATUS, METHOD AND ARTICLE FOR PROVIDING LOCATIONS OF POWER STORAGE DEVICE COLLECTION, CHARGING AND DISTRIBUTION MACHINES" and filed Jul. 26, 2012; U.S. patent application Ser. No. 13/559,343 entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE" and filed Jul. 26, 2012; and U.S. patent application Ser. No. 13/559,064 entitled "APPARATUS, METHOD AND ARTICLE FOR RESERVING POWER STORAGE DEVICES AT RESERVING POWER STORAGE DEVICE COLLECTION, CHARGING AND DISTRIBUTION MACHINES" and filed on Jul. 26, 2012; U.S. patent application Ser. No. 13/646,320 entitled "DETECTIBLE INDICATION OF AN ELECTRIC MOTOR VEHICLE STANDBY MODE" and filed on Oct. 5, 2012; U.S. patent application Ser. No. 13/650,498 entitled "ELECTRIC DEVICES" and filed on Oct. 12, 2012; U.S. patent application Ser. No. 13/650,392 entitled "DRIVE ASSEMBLY FOR ELECTRIC DEVICE" and filed on Oct. 12, 2012; U.S. patent application Ser. No. 13/650,395 entitled "ELECTRIC DEVICE DRIVE ASSEMBLY AND COOLING SYSTEM FOR ELECTRIC DEVICE DRIVE" and filed on Oct. 12, 2012; U.S. patent application Ser. No. 13/559,054 entitled "ELECTRIC DEVICE DRIVE ASSEMBLY AND COOLING SYSTEM FOR ELECTRIC DEVICE DRIVE" and filed on Jul. 26, 2012; U.S. patent application Ser. No. 13/559,125 entitled "ELECTRIC DEVICE DRIVE ASSEMBLY AND COOLING SYSTEM FOR ELECTRIC DEVICE DRIVE" and filed on Jul. 26, 2012 are incorporated herein by reference, in their entirety. Aspects of the embodiments can be modified, if necessary, to employ systems, circuits and concepts of the various patents, applications and publications to provide yet further embodiments.

While generally discussed in the environment and context of physical security of personal transportation vehicles such as all-electric scooters and/or motorbikes, the teachings herein can be applied in a wide variety of other environments, including other vehicular as well as non-vehicular environments.

The above description of illustrated embodiments, including what is described in the Abstract of the Disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A vehicle security system for a vehicle, comprising:
at least one controller; and
at least one communications module coupled to the at least one controller, wherein the at least one controller is configured to:
receive information indicating whether the vehicle is in a state to allow operation of the vehicle;
in response to receiving the information whether the vehicle is in a state to allow operation of the vehicle, make a determination of whether to allow one or more wheels of the vehicle to roll based on the received information indicating whether the vehicle is in a state to allow operation of the vehicle;
prevent the one or more wheels from rotating if the received information indicating whether the vehicle is in a state to allow operation of the vehicle indicates the vehicle is not in a state to allow operation of the vehicle, wherein the at least one controller is configured to prevent the one or more wheels from rolling by being configured to:
detect rotation of the one or more wheels in a first direction; and
send a signal to cause a motor of the vehicle to rotate at least one of the one or more wheels in a second direction opposite of the first direction until the at least one controller no longer detects the rotation of the one or more wheels in the first direction.

2. The vehicle security system of claim 1 wherein the at least one controller is configured to detect the rotation of the one or more wheels in the first direction by being configured to:
receive a motion detection signal from a motion sensor operably coupled to a drive system of the vehicle or coupled to a motor of the vehicle.

3. The vehicle security system of claim 1 wherein the at least one controller is configured to detect the rotation of the one or more wheels in the first direction by being configured to:
receive a motion detection signal from a motion sensor configured to detect motion by using global positioning system data regarding location of the vehicle.

4. The vehicle security system of claim 3, further comprising the motion sensor operably coupled to the at least one controller.

5. The vehicle security system of claim 1 wherein the received information indicating whether the vehicle is in a state to allow operation of the vehicle is information received indicating whether a key is present in an ignition of the vehicle and wherein the at least one controller is configured to prevent the one or more wheels from rolling if the received information indicates a key is not present in the ignition.

6. The vehicle security system of claim 1 wherein the received information indicating whether the vehicle is in a state to allow operation of the vehicle is information received wirelessly regarding authentication of an external device received via the communications module, and wherein the at least one controller is configured to allow the one or more wheels to roll if the received information indicates the external device is authenticated and prevent the one or more wheels from rolling if the received information indicates the external device is not authenticated or indicates no external device is detected.

7. The vehicle security system of claim 6 wherein the external device is a key fob.

8. The vehicle security system of claim 6 wherein the external device is a mobile device.

9. The vehicle security system of claim 6 wherein the at least one controller is configured to determine whether the received information indicates the external device is authenticated by being configured to:
generate a challenge key to send to the external device;
send the challenge key to the external device;
receive a response from the external device to the sending of the challenge key, the response including a response code as part of the received information;
generate an output from a secret algorithm using a secret key and the response code as input, the secret algorithm and the secret key configured to be known only to the vehicle security system and one or more authorized external devices; and
compare the output from the secret algorithm to the response code, and wherein the at least one controller is configured to determine whether received information indicates the external device is authenticated based at least on the comparison.

10. The vehicle security system of claim 1 wherein the at least one controller is coupled to a motor of the vehicle.

11. The vehicle security system of claim 1 wherein the vehicle is an electric two-wheeled vehicle.

12. The vehicle security system of claim 1 wherein the at least one controller is further configured to prevent the one or more wheels from rolling by being configured to:
detect motion of the vehicle in a first direction by being configured to receive a motion detection signal from a motion sensor; and
send a signal to a motor of the vehicle to rotate at least one of the one or more wheels in a second direction associated with moving the vehicle in a direction opposite of the first direction until the at least one controller no longer detects the motion of the vehicle in the first direction from the motion sensor.

13. The vehicle security system of claim 12 wherein the motion sensor is operably coupled to the at least one controller and is configured to detect the motion in the first direction via an accelerometer of the motion sensor.

14. A method of operating a vehicle security system for a vehicle, the method comprising:
receiving information indicating whether the vehicle is in a state to allow operation of the vehicle; and
preventing one or more wheels of the vehicle from rotating if the received information indicating whether the vehicle is in a state to allow operation of the vehicle indicates the vehicle is not in a state to allow operation of the vehicle, wherein the preventing includes:
detecting, by at least one controller, rotation of the one or more wheels in a first direction; and sending a signal to cause a motor of the vehicle to rotate at least one of the one or more wheels in a second direction opposite of the first direction until the at least one controller no longer detects the rotation of the one or more wheels in the first direction.

15. The method of claim 14 wherein the state to allow operation of the vehicle is a state in which a key is present in an ignition of the vehicle.

16. The method of claim 14 wherein the state to allow operation of the vehicle is a state in which an authorized external device has been wirelessly authenticated by the vehicle security system.

17. A vehicle, comprising:
a motor;
at least two wheels operably coupled to the motor;
a motor controller operably coupled to the motor;
one or more driver controls operably coupled to the motor controller, and wherein the motor controller includes a vehicle security system configured to:
receive information indicating whether the vehicle is in a state to allow operation of the vehicle; and
in response to receiving the information whether the vehicle is in a state to allow operation of the vehicle, make a determination of whether to allow one or more wheels of the vehicle to roll based on the received information indicating whether the vehicle is in a state to allow operation of the vehicle;
detect rotation of the one or more wheels in a first direction; and
if the determination was to not allow one or more wheels of the vehicle to roll, send a signal to cause a motor of the vehicle to rotate at least one of the one or more wheels in a second direction opposite of the first direction until the vehicle security system no longer detects the rotation of the one or more wheels in the first direction.

18. The vehicle of claim 17 wherein the vehicle security system is configured to detect rotation of one or more of the at least two wheels in a first direction by being configured to:
detect rotation or phase change of the motor caused by the rotation of the one or more of the at least two wheels.

\* \* \* \* \*